US010958090B2

(12) United States Patent
Mizoguchi et al.

(10) Patent No.: US 10,958,090 B2
(45) Date of Patent: Mar. 23, 2021

(54) CHARGING PAD AND WIRELESS TELEPHONE

(71) Applicant: PANASONIC INTELLECTUAL PROPERTY MANAGEMENT CO., LTD., Osaka (JP)

(72) Inventors: Yoshihiro Mizoguchi, Fukuoka (JP);
Tadashi Shimotoso, Fukuoka (JP);
Yasushi Kitajima, Fukuoka (JP);
Yoshihiro Takata, Fukuoka (JP);
Shunichi Itai, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/781,312

(22) Filed: Feb. 4, 2020

(65) Prior Publication Data
US 2020/0259346 A1 Aug. 13, 2020

(30) Foreign Application Priority Data

Feb. 7, 2019 (JP) .............................. JP2019-020985

(51) Int. Cl.
*H04B 1/38* (2015.01)
*H02J 7/00* (2006.01)
*H04M 1/02* (2006.01)

(52) U.S. Cl.
CPC ......... *H02J 7/0045* (2013.01); *H04M 1/0262* (2013.01)

(58) Field of Classification Search
CPC .... H02J 7/0045; H02J 7/007184; H02J 7/008;
H04M 1/0262; H04M 2001/0204

USPC ......................................................... 455/573
See application file for complete search history.

(56) References Cited

U.S. PATENT DOCUMENTS

| 5,479,486 | A | * | 12/1995 | Saji | ..................... | H02J 7/0045 455/573 |
| 5,691,618 | A | * | 11/1997 | Kobayashi | ............ | H02J 7/0042 320/115 |
| 5,828,966 | A | * | 10/1998 | Davis | .................... | H02J 7/0042 455/573 |
| 6,400,969 | B1 | * | 6/2002 | Yamashita | ............... | H01H 3/16 320/114 |

(Continued)

FOREIGN PATENT DOCUMENTS

JP        2012-248373 A     12/2012

*Primary Examiner* — Sonny Trinh
(74) *Attorney, Agent, or Firm* — Seed IP Law Group LLP

(57) ABSTRACT

A charging pad includes a body portion having a recess into which a power receiving unit of a handset is inserted, the power receiving unit having an exposed electric contact surface, a first charging-pad-side terminal formed by a torsion coil spring and provided in the recess, the first charging-pad-side terminal being configured to relatively slide on the electric contact surface accompanying an insertion of the power receiving unit into the charging pad, and to be conductively connected to the electric contact surface at a position where the first charging-pad-side terminal stops sliding after the insertion of the power receiving unit is completed, and a second charging-pad-side terminal formed by a torsion coil spring and provided in the recess, the second charging-pad-side terminal being configured to relatively slide on the electric contact surface accompanying the insertion of the power receiving unit into the charging pad.

6 Claims, 12 Drawing Sheets

(56) References Cited

U.S. PATENT DOCUMENTS

| | | | |
|---|---|---|---|
| 7,775,812 B2* | 8/2010 | Nakazawa | H01R 13/4536 439/137 |
| 2006/0089178 A1* | 4/2006 | Sakata | H02J 7/0044 455/573 |

* cited by examiner

CHARGING PAD AND WIRELESS TELEPHONE

CROSS REFERENCE TO RELATED APPLICATIONS

This application is based upon and claims the benefit of priority of Japanese Patent Application No. 2019-20985 filed on Feb. 7, 2019, the contents of which are incorporated herein by reference in its entirety.

BACKGROUND OF THE INVENTION

1. Field of the Invention

The present disclosure relates to a charging pad and a wireless telephone.

2. Description of the Related Art

A contact device is known to have a cleaning function of electrically connecting a fixed terminal such as a terminal or an electrode provided in the device body and a movable terminal such as a terminal or an electrode provided on a base by bringing the fixed terminal and the movable terminal into reliable contact (for example, JP-A-2012-248373 referred to as Patent Literature 1). In the contact device, the fixed terminal is provided at a lower portion of the device body and the movable terminal is provided in a fitting recess of the base. The movable terminal includes a movable contact portion that is displaceable between a protruding position protruding from the fitting recess and a retracted position retracted toward the fitting recess further than the protruding position. When the movable contact portion is pressed from the protruding position to the retracted position by the attachment of the device body to the base, the movable contact portion self-cleans by moving in one direction and then in the other direction in a state of being in contact with the fixed terminal, re-adhesion of dirt due to foreign matters or the like adhered to the fixed terminal is prevented, and a reliable electric contact between the fixed terminal and the movable terminal is achieved.

Patent Literature 1: JP-A-2012-248373

SUMMARY OF THE INVENTION

In the contact device having the cleaning function of Patent Literature 1, however, when the device body is attached to the fitting recess of the base, the movable contact portion moves in one direction along the fixed terminal and then in the other direction after the moving direction is reversed. Dirt adhered to the fixed terminal is removed by the movement of the movable contact portion in one direction. Thereafter, the same movable contact portion moves in the other direction and contacts the fixed terminal again. Such operation is effective for removing foreign matters having low viscosity but may not be desirable for removing foreign matters having high viscosity. For example, under a usage environment such as a Chinese restaurant, oil stains having a strong adhesive force may move in the other direction while adhering to the movable contact portion accompanying reversal of the movement direction. In this case, a stable charging operation may not be performed since the movable contact portion and the fixed terminal are in electric contact with remaining foreign matters.

The present disclosure is proposed in view of the above situation in the related art and a non-limited object thereof is to provide a charging pad and a wireless telephone that enable a more stable charging operation.

An aspect of the present disclosure provides a charging pad including: a body portion having a recess into which a power receiving unit of a handset is configured to be inserted, the power receiving unit having an exposed electric contact surface; a first charging-pad-side terminal formed by a torsion coil spring and provided in the recess of the body portion, the first charging-pad-side terminal being configured to relatively slide on the electric contact surface of the power receiving unit accompanying an insertion of the power receiving unit into the charging pad, and to be conductively connected to the electric contact surface at a position where the first charging-pad-side terminal stops sliding after the insertion of the power receiving unit is completed; and a second charging-pad-side terminal formed by a torsion coil spring and provided in the recess of the body portion, the second charging-pad-side terminal being configured to relatively slide on the electric contact surface of the power receiving unit accompanying the insertion of the power receiving unit into the charging pad.

An aspect of the present disclosure provides a charging pad including: a body portion having a recess into which a power receiving unit of a handset is configured to be inserted, the power receiving unit having an exposed electric contact surface; and two charging-pad-side terminals formed by torsion coil springs and provided in the recess, the charging-pad-side terminals being configured to relatively slide on the electric contact surface of the power receiving unit accompanying an insertion of the power receiving unit into the charging pad, wherein a first charging-pad-side terminal of the two charging-pad-side terminals first slides on a surface of the electric contact surface with the insertion of the power receiving unit, and wherein after the insertion of the power receiving unit is completed, a second charging-pad-side terminal of the two charging-pad-side terminals is conductively connected to the surface slid by the first charging-pad-side terminal.

An aspect of the present disclosure provides a charging pad including: a body portion having a recess into which a power receiving unit of a handset is configured to be inserted, the power receiving unit having an exposed electric contact surface; and two charging-pad-side terminals formed by torsion coil springs and provided in the recess, the charging-pad-side terminals being configured to relatively slide on the electric contact surface of the power receiving unit accompanying an insertion of the power receiving unit into the charging pad, and to be both conductively connected to the electric contact surface after the insertion of the power receiving unit is completed.

An aspect of the present disclosure provides a wireless telephone including: a charging pad; and a handset in which the power receiving unit having the exposed electric contact surface is inserted into the recess of the body portion of the charging pad.

According to the present disclosure, a more stable charging operation can be performed in the charging pad.

DETAILED DESCRIPTION OF THE EXEMPLARY EMBODIMENTS

Hereinafter, an embodiment specifically disclosing configurations and functions of a charging pad and a wireless telephone according to the present disclosure will be described in detail with reference to the drawings as appropriate. Detailed descriptions more than necessary may be omitted. For example, a detailed description of a well-known matter or a repeated description of substantially the same configurations may be omitted. This is to avoid unnecessary redundancy in the following description and to facilitate understanding of those skilled in the art. The accompanying drawings and the following description are provided for a thorough understanding of the present disclosure by those skilled in the art, which are not intended to limit the subject matter recited in the claims.

Figure 1:
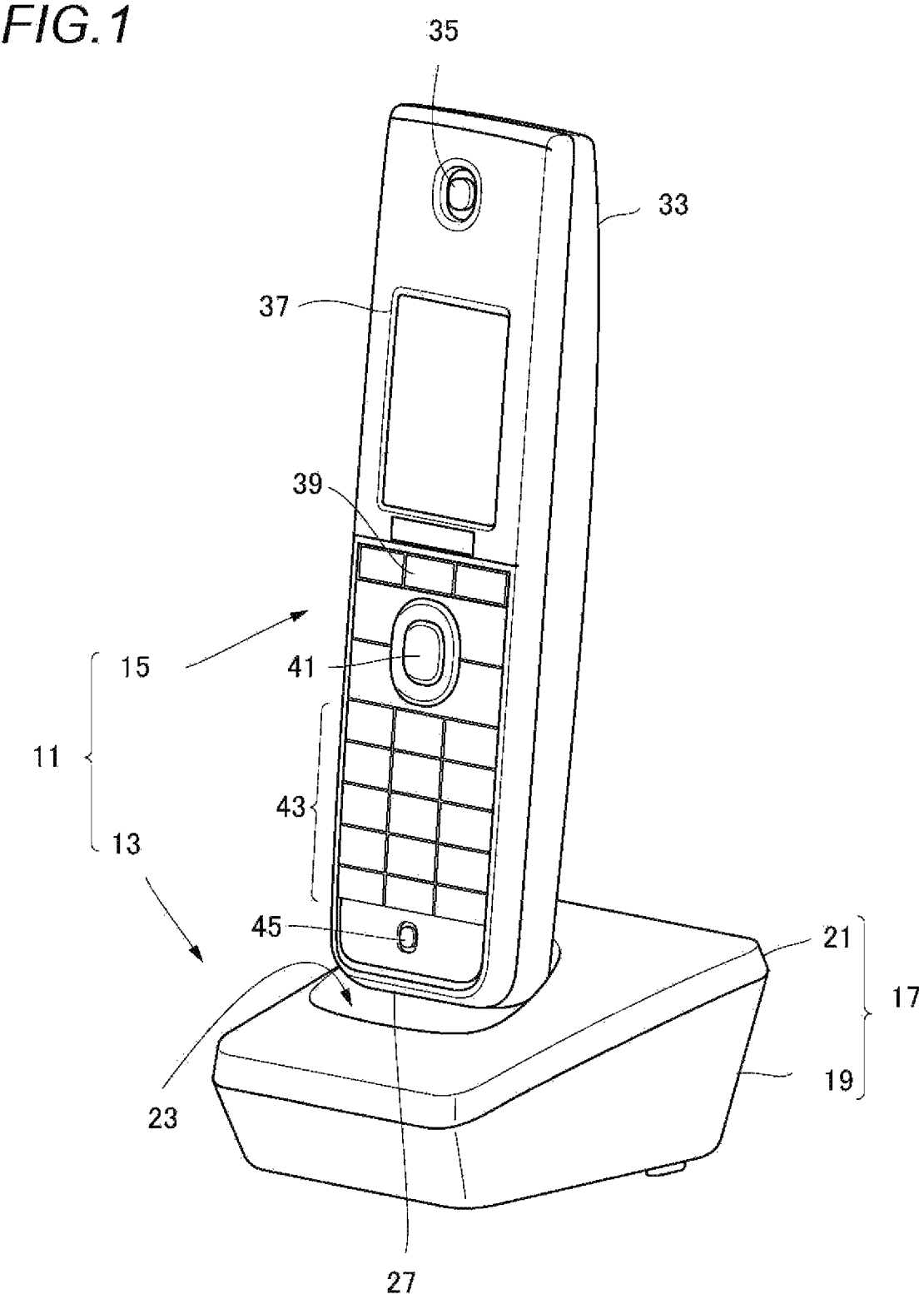
FIG. 1 is an external perspective view of a wireless telephone according to a first embodiment.

FIG. 1 is an external perspective view of a wireless telephone 11 according to a first embodiment. The wireless telephone 11 according to the first embodiment mainly includes a charging pad 13 and a handset 15. The charging pad 13 according to the first embodiment mainly includes a body portion 17 and a charging-pad-side terminal.

The body portion 17 of the charging pad 13 includes a lower case 19 formed of resin or the like and an upper case 21 formed of resin or the like. The upper case 21 includes a recess 23 that recesses the center of an upper surface of the upper case 21. A power receiving unit 27 of the handset 15 is inserted into the recess 23. The power receiving unit 27 includes exposed electric contact surfaces 25 (see FIG. 3).

Figure 2:
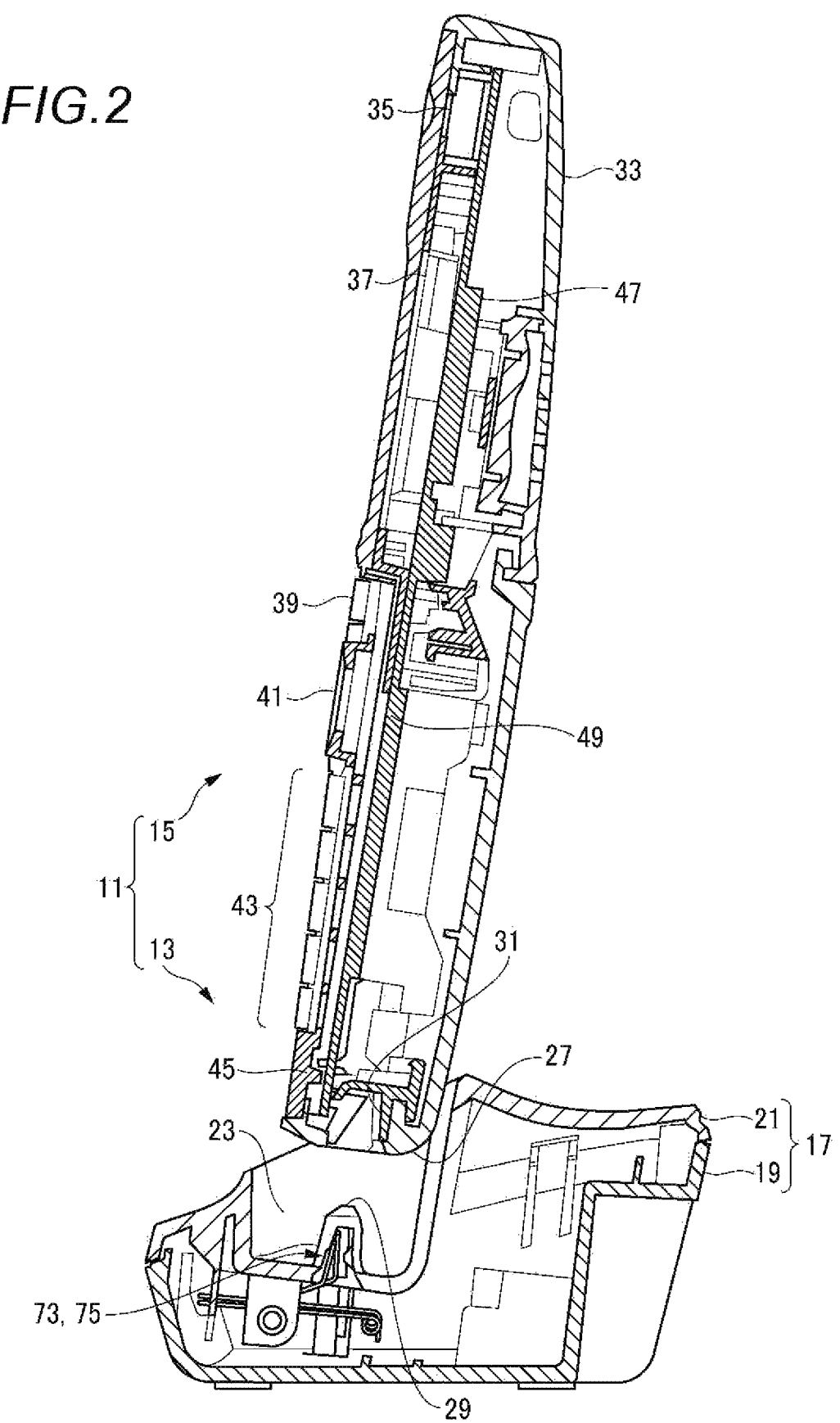
FIG. 2 is a side cross-sectional view of FIG. 1.

FIG. 2 is a side cross-sectional view of FIG. 1. A pair of fitting protrusions 29 protrude from a bottom wall of the recess 23. The pair of fitting protrusions 29 enter a rectangular power receiving opening 31 that opens at a lower surface of the power receiving unit 27 with the power receiving unit 27 of the handset 15 being inserted into the recess 23.

The handset 15 includes a housing 33 formed of resin. The housing 33 has a flat and substantially rectangular parallelepiped shape that is long in the upper-lower direction. The surface of the housing 33 is provided with a receiving unit 35, a display unit 37, a function key 39, a selection key 41, a numeric keypad 43, a transmitting unit 45, and the like in order from the top to the bottom. Inside the housing 33, electronic components 47 that enable wireless transmission and reception, a substrate 49 on which various control circuits are mounted, a power supply, and the like are accommodated.

Figure 3:
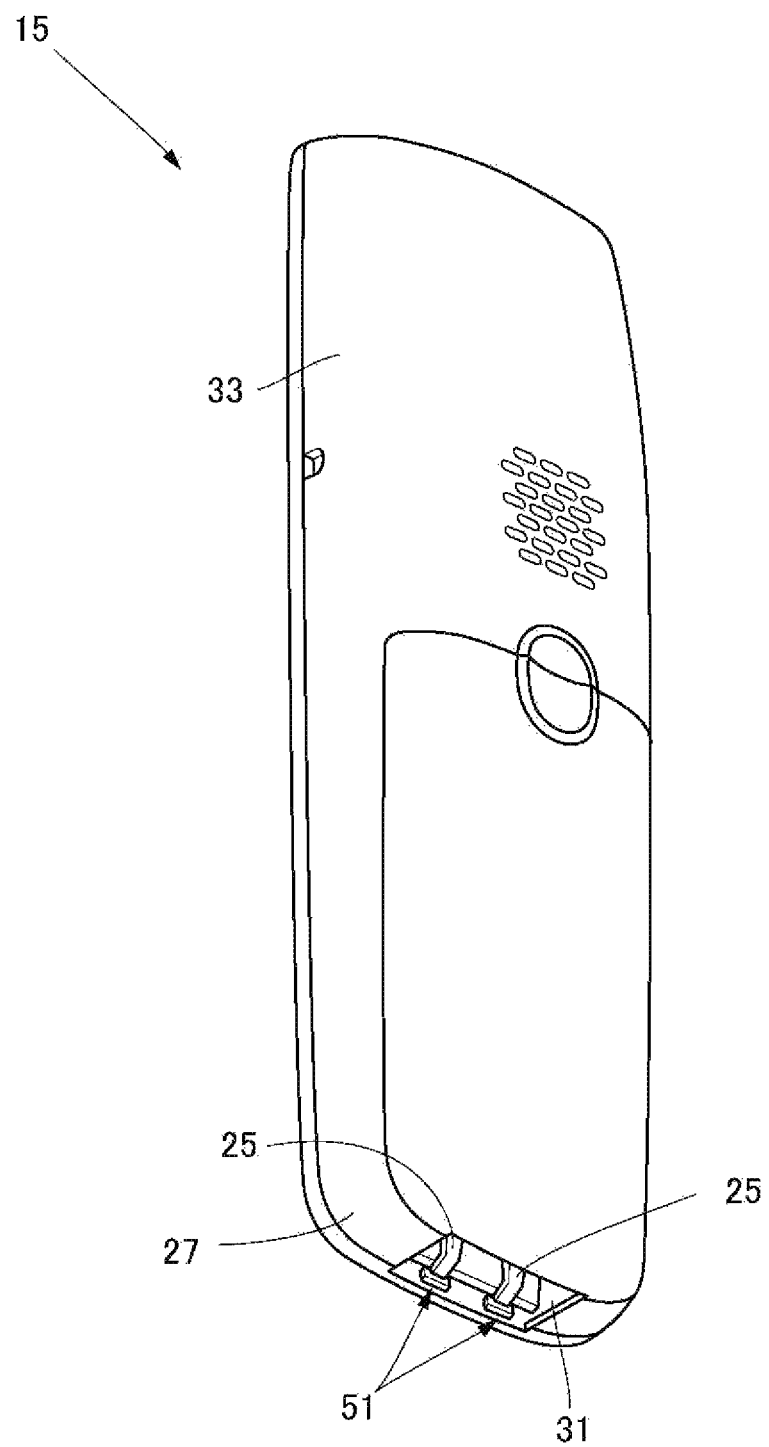
FIG. 3 is a perspective view of a handset in FIG. 1 as viewed from a rear surface side.

FIG. 3 is a perspective view of the handset 15 in FIG. 1 as viewed from a rear surface side. The housing 33 has a pair of electric contact surfaces 25 exposed inside the power receiving opening 31 provided in the power receiving unit 27. The electric contact surfaces 25 are separately formed on power receiving terminals 51 on a positive side and a negative side that are connected to a power supply circuit. The pair of fitting protrusions 29 protruding from the recess 23 of the charging pad 13 enter two sides of the power receiving opening 31 with the pair of electric contact surfaces 25 interposed therebetween.

Figure 4:
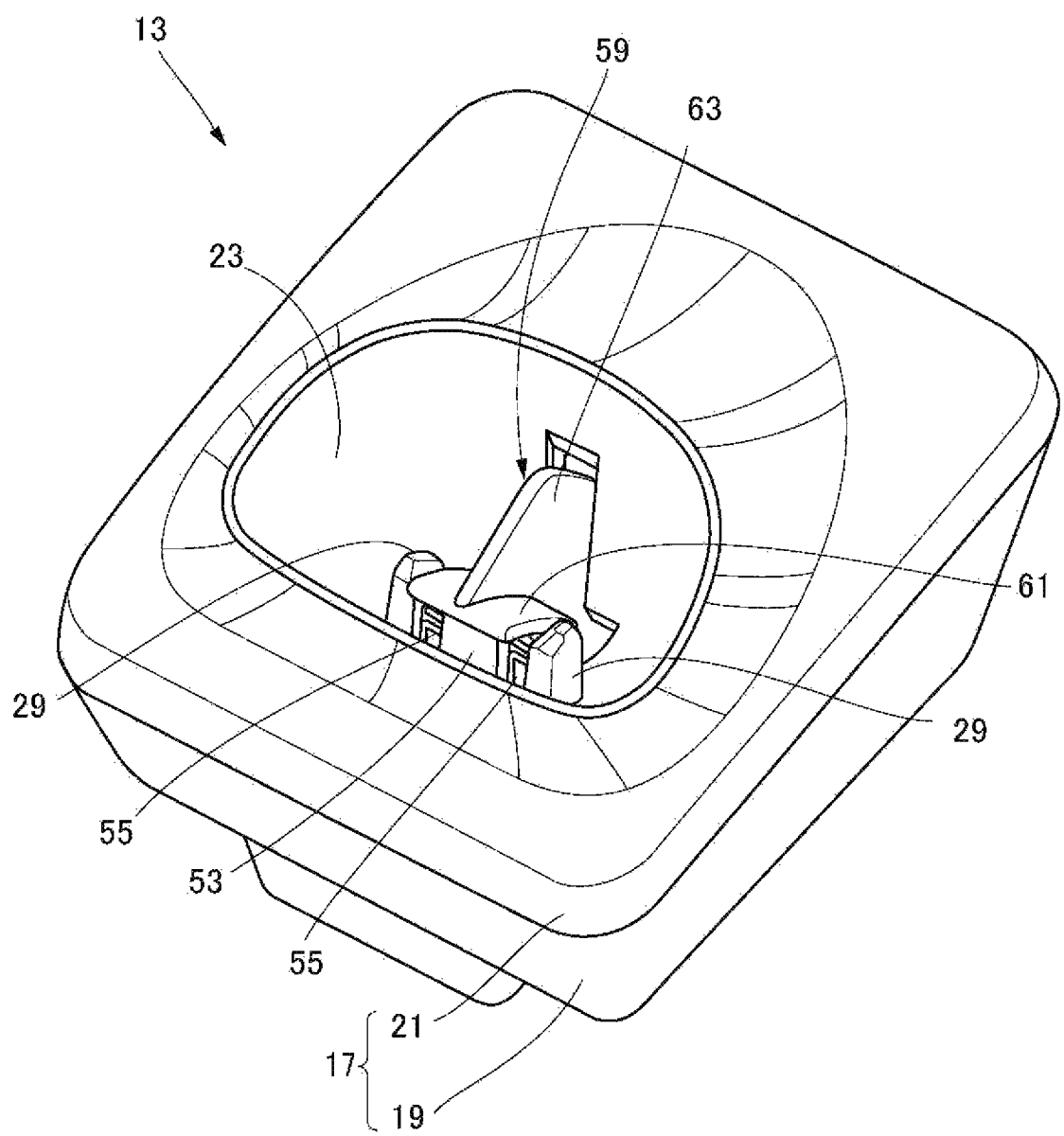
FIG. 4 is a perspective view of a charging pad in FIG. 1.

FIG. 4 is a perspective view of the charging pad 13 in FIG. 1. A partition wall 53 slightly lower than the fitting protrusions 29 protrudes between the pair of fitting protrusions 29 of the recess 23. The partition wall 53 and the fitting protrusions 29 on two sides define a pair of power receiving terminal entry gaps 55 therebetween. The pair of power receiving terminal entry gaps 55 are cut in the inserting direction of the power receiving unit 27. Accordingly, when the power receiving unit 27 of the handset 15 is inserted into the recess 23, the electric contact surfaces 25 of the pair of power receiving terminals 51 provided in the power receiving unit 27 may enter the power receiving terminal entry gaps 55.

Figure 5:
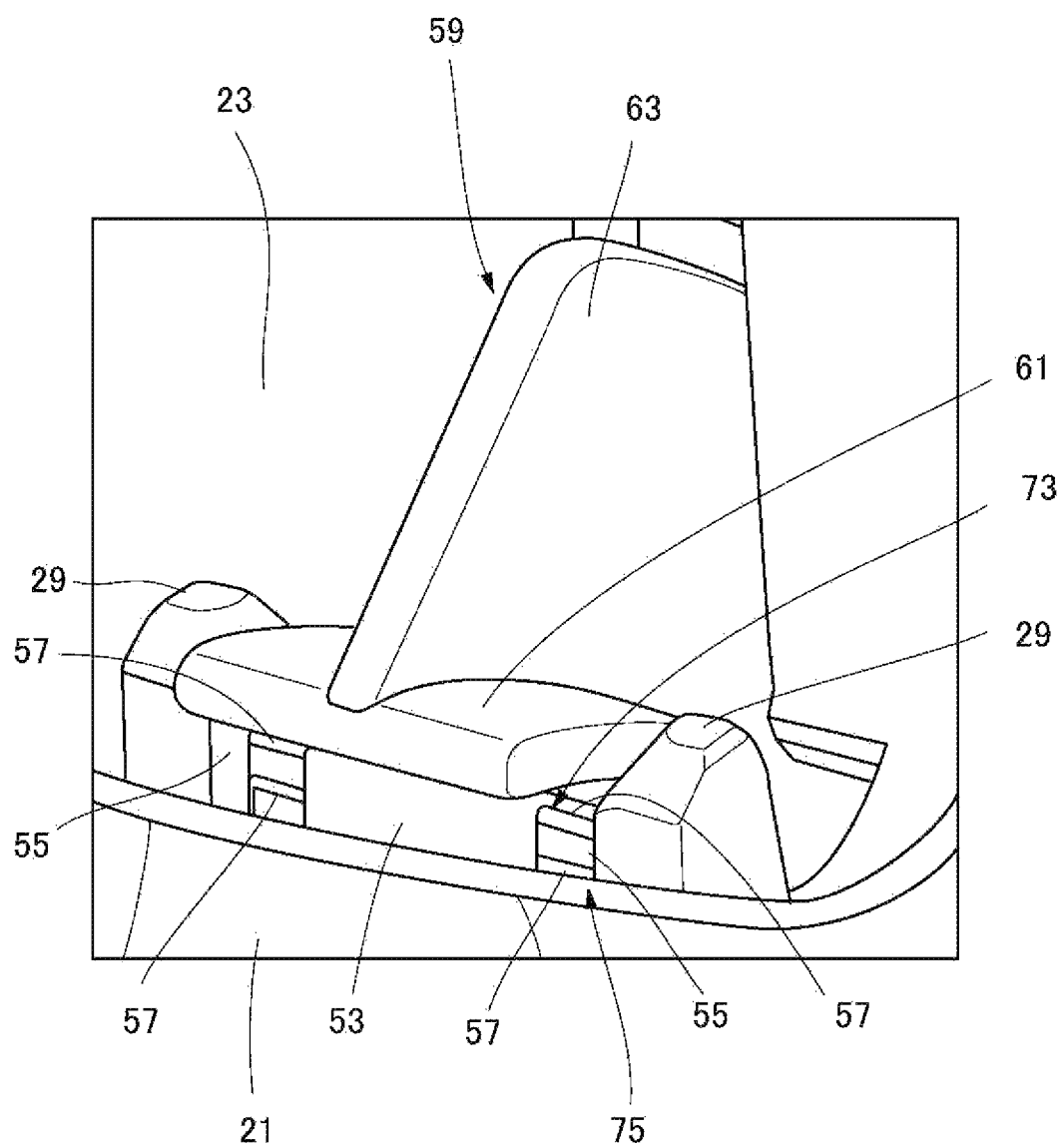
FIG. 5 is an enlarged view of a main part in FIG. 4.

FIG. 5 is an enlarged view of a main part of FIG. 4. Contact portions 57 of two charging-pad-side terminals are separately provided in the pair of power receiving terminal entry gaps 55. That is, two charging-pad-side terminals on the positive side and two charging-pad-side terminals on the negative side, which are four in total, have their contact portions 57 separately arranged in the pair of power receiving terminal entry gaps 55. The number of contact portions 57 may be more than two, such as three or four.

An upper end of the partition wall 53 abuts against a lower surface of a swing end of a cover 59. The cover 59 includes a cover plate 61 that abuts against the upper end of the partition wall 53. A substantially triangular pressing plate 63 that stands vertically is formed substantially at the center of an upper surface of the cover plate 61. A support leg portion 65 (see FIG. 7) is formed at a lower end of the cover plate 61. A pivot shaft 67 (see FIG. 7) of the support leg portion 65 at an end opposite to the cover plate 61 is swingably supported by a bearing portion 69 (see FIG. 7) provided in the lower case 19. The pivot shaft 67 has its central axis parallel to the electric contact surfaces 25 of the handset 15 and orthogonal to the inserting direction of the power receiving unit 27. The cover 59 swings about the pivot shaft 67 so as to be movable in the recess 23 between a position at which the charging-pad-side terminals are covered and a position at which the charging-pad-side terminals are exposed.

In a normal state (for example, when the handset 15 is not inserted), the cover 59 is biased by a cover spring 71 (see FIG. 7) in a direction in which the lower surface of the swing end of the cover plate 61 abuts against the upper end of the partition wall 53, as is shown in FIG. 5. Accordingly, the cover 59 covers the charging-pad-side terminals in the normal state. When the power receiving unit 27 of the handset 15 is inserted into the recess 23, the pressing plate 63 of the cover 59 is pressed by the lower surface of the power receiving unit 27 and swings to the position where the charging-pad-side terminals are exposed (see FIG. 9).

Figure 6:
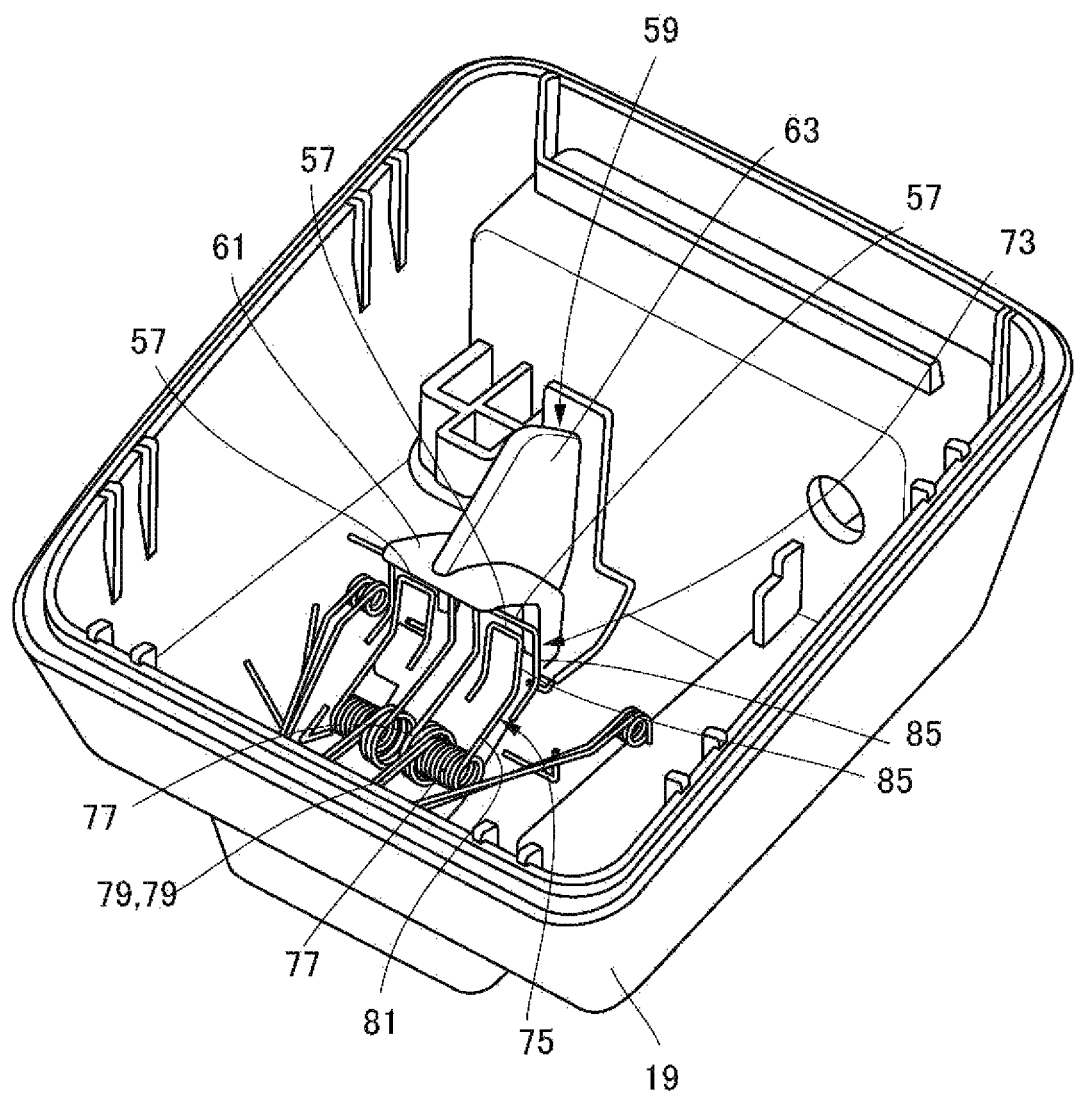
FIG. 6 is a perspective view of the charging pad in FIG. 4 from which an upper case is removed.

FIG. 6 is a perspective view of the charging pad 13 in FIG. 4 from which the upper case 21 is removed. The charging-pad-side terminals are formed of, for example, a torsion coil spring. The charging-pad-side terminals relatively slide on the electric contact surfaces 25 accompanying the insertion of the power receiving unit 27.

In the present specification, the term "relatively sliding" actually means that the electric contact surfaces 25 move relative to the charging-pad-side terminals held on the charging pad 13, and that the contact portions 57 move when the electric contact surfaces 25 are assumed to be stopped.

The charging-pad-side terminals are conductively connected to the electric contact surfaces 25 at a position where the sliding is stopped after insertion of the power receiving unit 27 is completed. One or a plurality of (for example, two) charging-pad-side terminals may be arranged for each of the power receiving terminals 51 on the positive side and the negative side.

The charging pad 13 may include one or a plurality of charging-pad-side terminals that are conductively connected to the electric contact surfaces 25 at the position where the sliding is stopped after the insertion of the power receiving unit 27 is completed.

The charging pad 13 according to the first embodiment includes two charging-pad-side terminals. After the insertion of the power receiving unit 27 is completed and after one of the charging-pad-side terminals slides on a surface of the electric contact surfaces 25, at least the other charging-pad-side terminal is conductively connected to the slid surface.

The charging pad 13 may include two charging-pad-side terminals that are both conductively connected to the electric contact surfaces 25 after the insertion of the power receiving unit 27 is completed.

Herein one of the two charging-pad-side terminals on the front side in the sliding direction is referred to as a first charging-pad-side terminal 73 and the other charging-pad-side terminal on the rear side in the sliding direction is referred to as a second charging-pad-side terminal 75. The charging-pad-side terminals are used as a general term including the first charging-pad-side terminal 73 and the second charging-pad-side terminal 75, with reference numerals omitted.

The charging-pad-side terminals are formed of, for example, a conductive material. An example of the conductive material includes a spring alloy having a low electric resistance such as beryllium copper or phosphor bronze. Surfaces of these alloys may be plated with nickel plating or gold plating on the nickel plating. Spring steel or stainless steel may also be used as the charging-pad-side terminals.

In torsion coil springs forming the first charging-pad-side terminal 73 and the second charging-pad-side terminal 75, one ends of coil springs 77 wound with spring wires are referred to as base end arm portions 79 and the other ends are referred to as distal end arm portions 81. An inner diameter side of the coil springs 77 is inserted to and supported on an outer diameter side of a guide rod 83 (see FIG. 7) formed in the lower case 19 of the charging pad 13. The guide rod 83 has its central axis parallel to the electric contact surfaces 25 of the handset 15 and orthogonal to the inserting direction of the power receiving unit 27. In the charging-pad-side terminals, the base end arm portions 79 are held by the charging pad 13 and the distal end arm portions 81 serve as free ends. A commercial power supply is connected to the base end arm portions 79 after being transformed into an appropriate voltage.

The first charging-pad-side terminal 73 and the second charging-pad-side terminal 75 each include a substantially U-shaped sliding bent portion 85 in the distal end side arms 81. The sliding bent portion 85 includes a contact portion 57 that is parallel to the electric contact surfaces 25 of the handset 15 and extends in a direction orthogonal to the inserting direction of the handset 15. As described above, two contact portions 57 are arranged in each of the power receiving terminal entry gaps 55 (see FIG. 5) on the positive side and the negative side. The number of contact portions 57 may be more than two, such as three or four.

The first charging-pad-side terminal 73 and the second charging-pad-side terminal 75 are arranged such that the contact portions 57 are parallel to each other by providing the small 7-shaped second charging-pad-side terminal 75 by an inner side of the first charging-pad-side terminal 73 whose U shape is reversed from left to right.

It is preferable but optional that a pressing force of one charging-pad-side terminal (that is, the first charging-pad-side terminal 73) of the charging pad 13 applied to the electric contact surfaces 25 is larger than a pressing force of the other charging-pad-side terminal (that is, the second charging-pad-side terminal 75) applied to the electric contact surface 25.

It is also preferable but optional that the spring load of one charging-pad-side terminal (that is, the first charging-pad-side terminal 73) of the charging pad 13 is larger than the spring load of the other charging-pad-side terminal (that is, the second charging-pad-side terminal 75).

Further, one charging-pad-side terminal (that is, the first charging-pad-side terminal 73) of the two charging-pad-side terminals of the charging pad 13 may be stopped at a position apart from the electric contact surface 25.

Next, operation of the charging pad 13 will be described.

Figure 7:
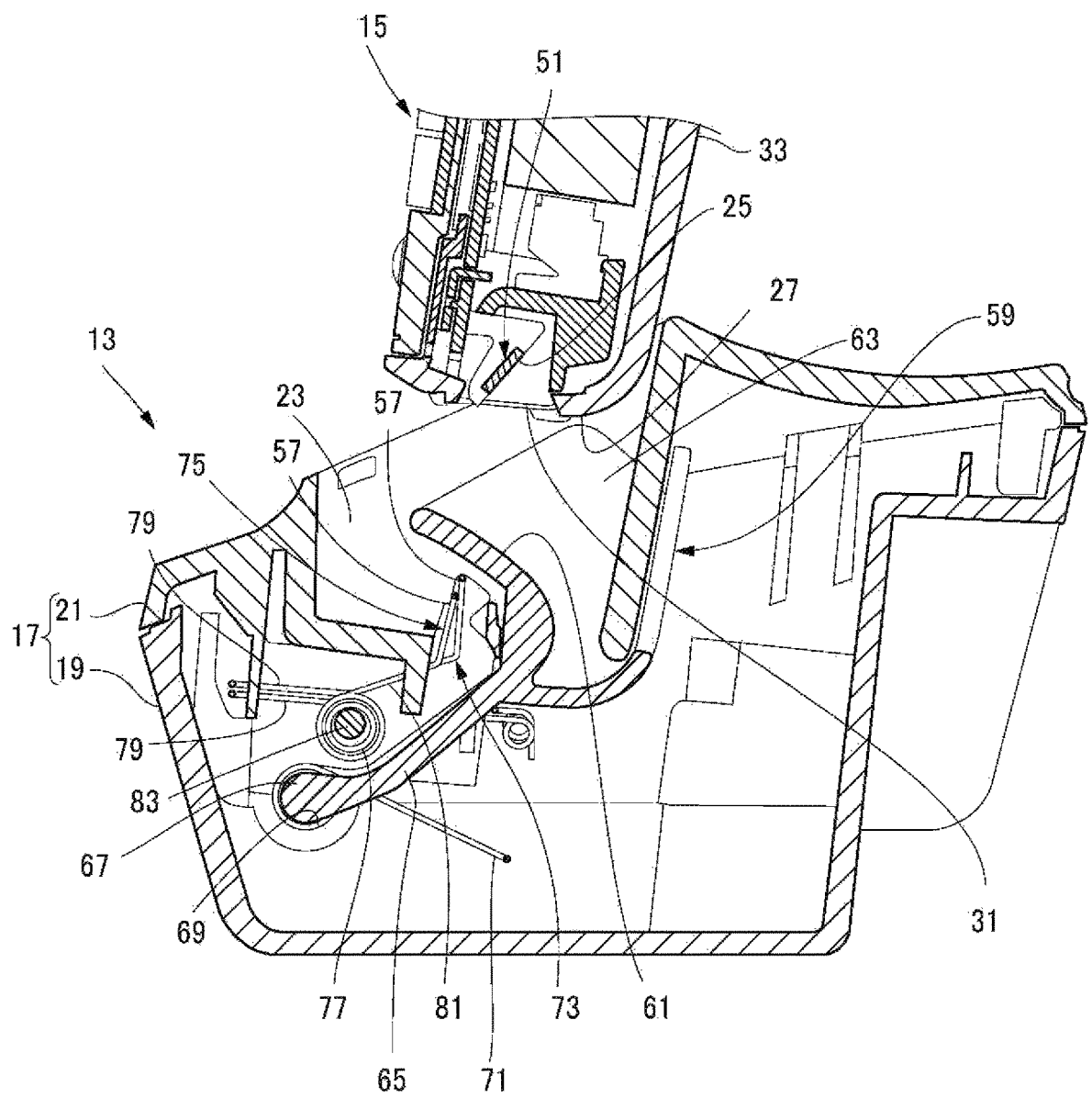
FIG. 7 is a side cross-sectional view of the charging pad during standby before the handset is inserted.

FIG. 7 is a side cross-sectional view of the charging pad 13 during standby before the handset 15 is inserted. In the charging pad 13, the first charging-pad-side terminal 73 and the second charging-pad-side terminal 75 are covered by the cover 59 during standby. Accordingly, the first charging-pad-side terminal 73 and the second charging-pad-side terminal 75 prevent adhesion of dirt entering from the upper opening of the recess 23.

Figure 8:
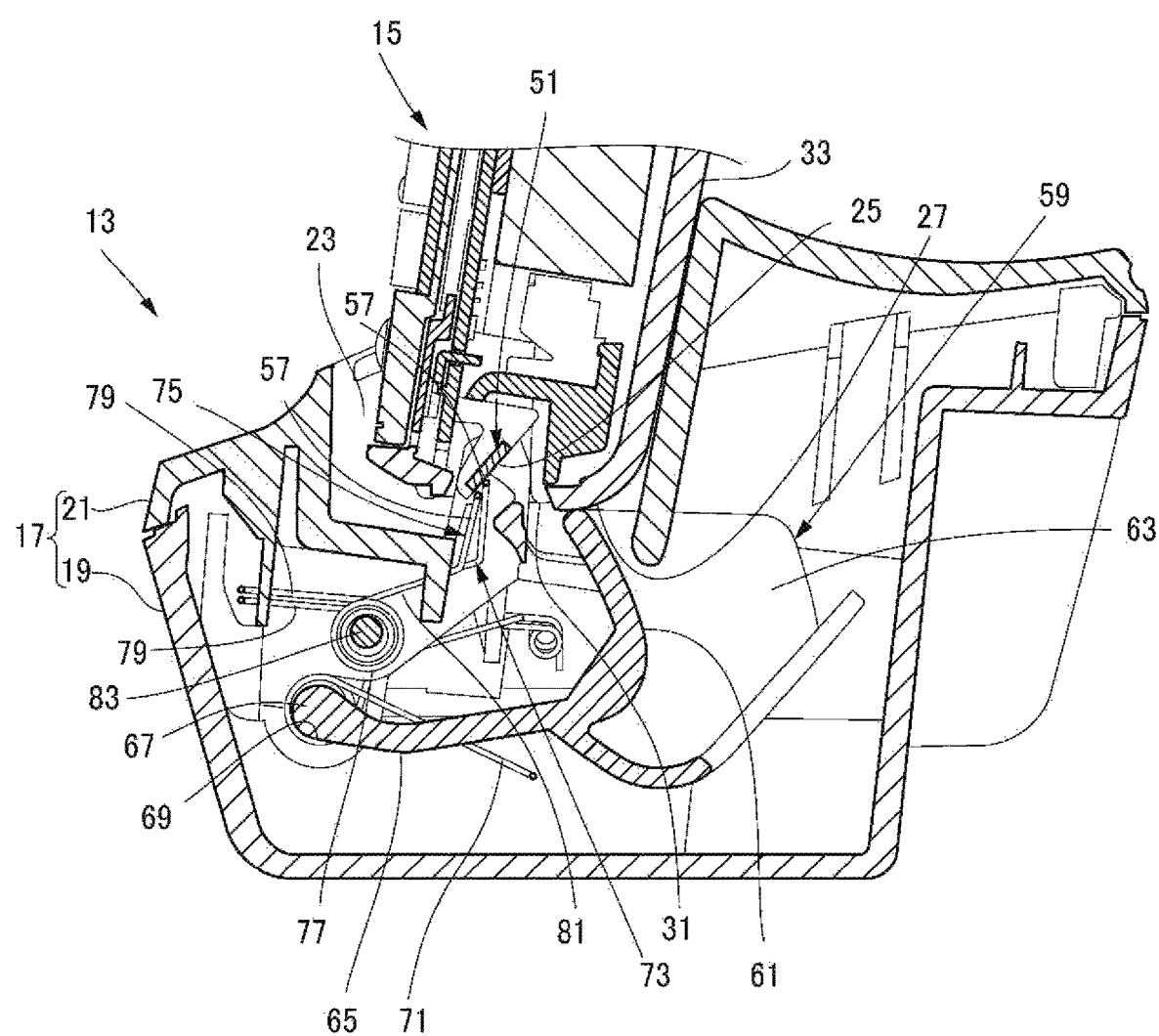
FIG. 8 is a side cross-sectional view of the charging pad during insertion of the handset when contact is started by a first charging-pad-side terminal.

FIG. 8 is a side cross-sectional view of the charging pad 13 during insertion of the handset 15 when contact is started by the first charging-pad-side terminal 73. When the power receiving unit 27 of the handset 15 is inserted into the recess 23, the pressing plate 63 of the cover 59 is pressed. The cover 59 whose pressing plate 63 is pressed rotates about the pivot shaft 67 and is pressed to the lower case 19 so that the first charging-pad-side terminal 73 and the second charging-pad-side terminal 75 are exposed. At the same time, the first charging-pad-side terminal 73 first enters the power receiving opening 31 of the power receiving unit 27 that has entered the recess 23. The first charging-pad-side terminal 73 that has entered the power receiving opening 31 starts contacting the electric contact surfaces 25 located inside the power receiving opening 31.

Figure 9:
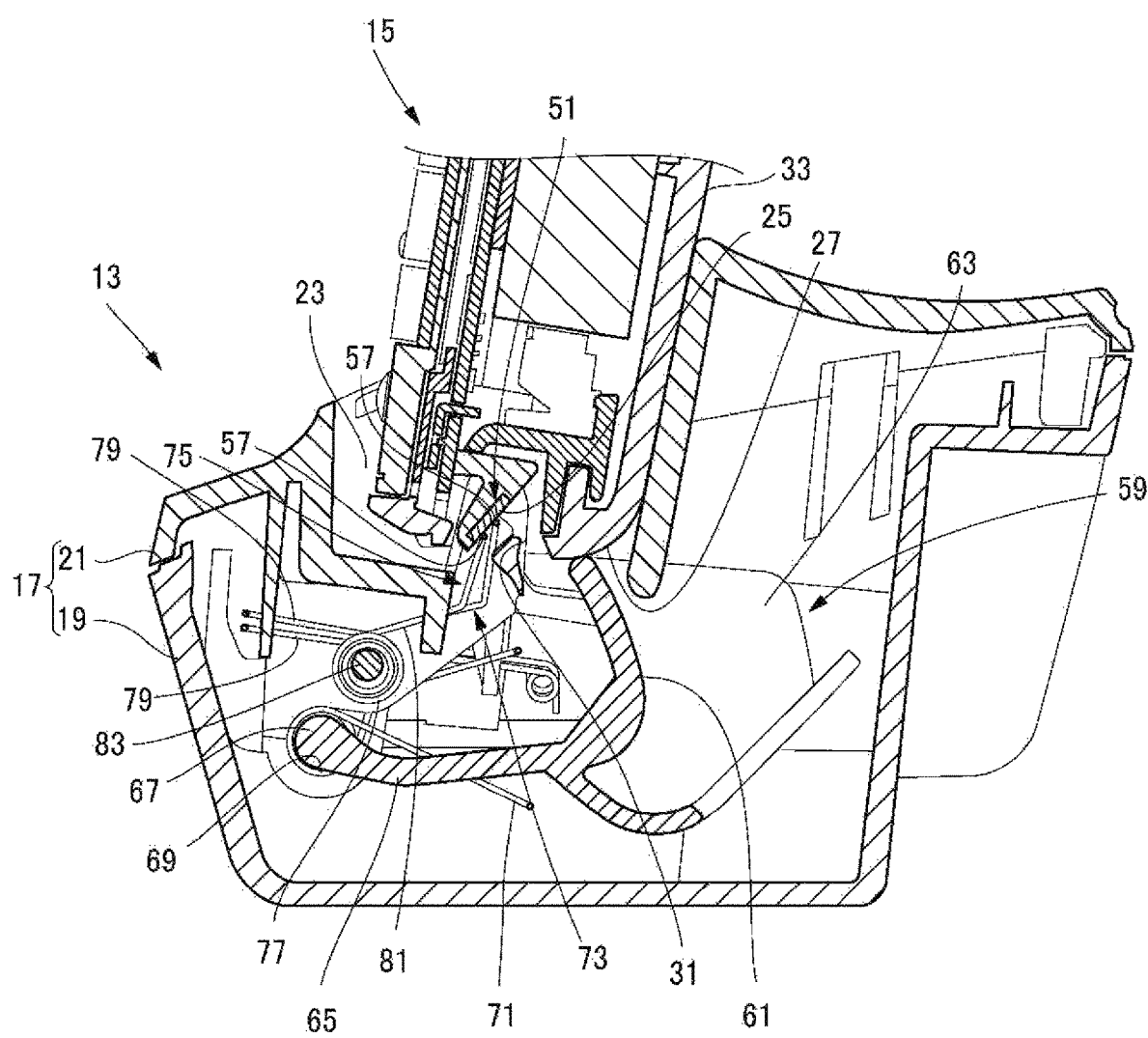
FIG. 9 is a side cross-sectional view of the charging pad during insertion of the handset when contact is started by a second charging-pad-side terminal.

FIG. 9 is a side cross-sectional view of the charging pad 13 during insertion of the handset 15 when contact is started by the second charging-pad-side terminal 75. When the power receiving unit 27 is further inserted into the recess 23, the first charging-pad-side terminal 73 slides upward on the electric contact surfaces 25. Subsequently, the second charging-pad-side terminal 75 starts contacting the electric contact surfaces 25 on a rear side of the contact start position of the first charging-pad-side terminal 73. The first charging-pad-side terminal 73 and the second charging-pad-side terminal 75 slide upward together on the electric contact surfaces 25 until the power receiving unit 27 is completely inserted.

Figure 10:
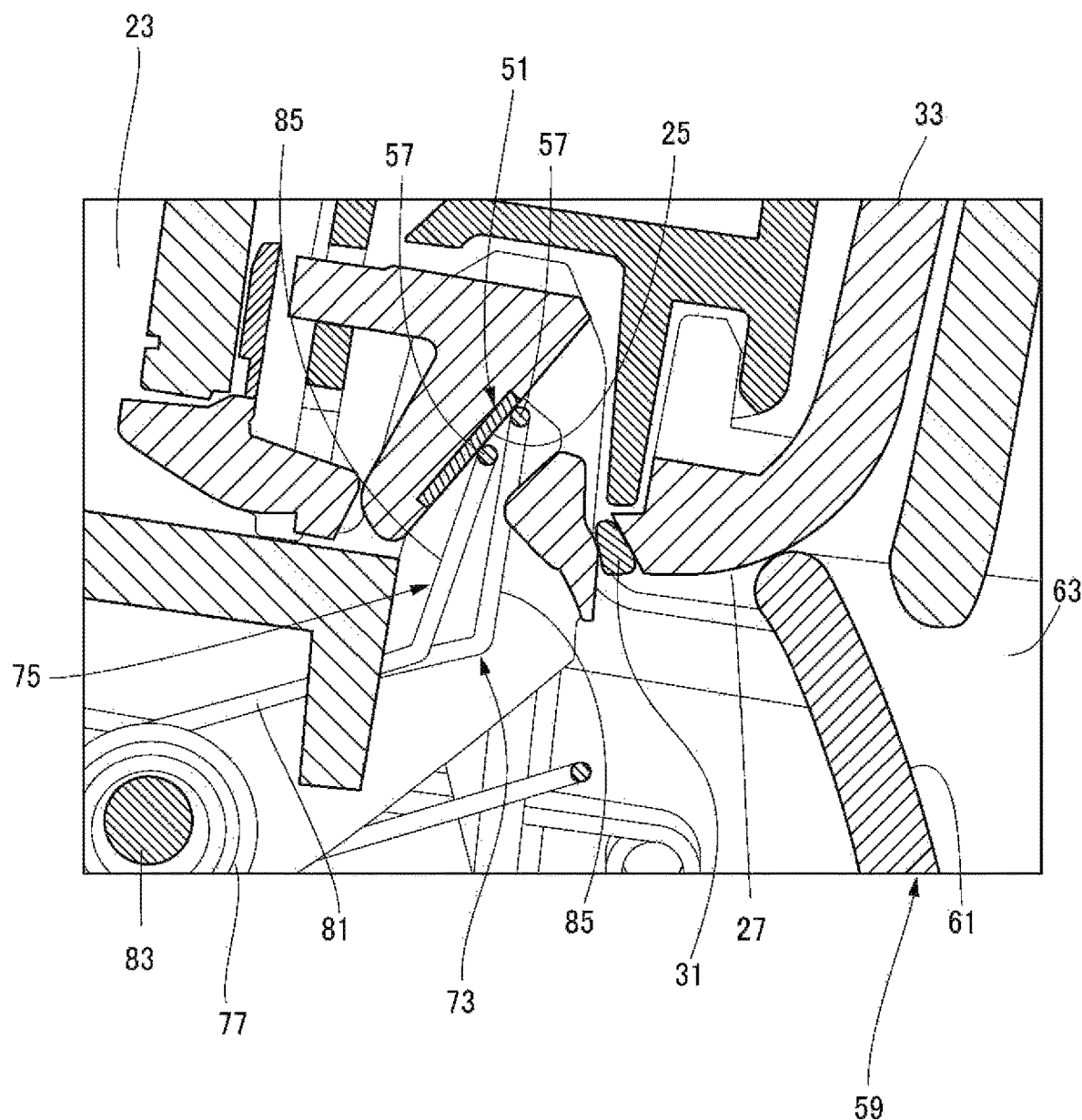
FIG. 10 is a side cross-sectional view of the charging pad when the handset is completely inserted and a charging state is established.

FIG. 10 is a side cross-sectional view of the charging pad 13 when the handset 15 is completely inserted and a charging state is established. The handset 15 is brought into a charging state when the insertion of the power receiving unit 27 is completed. In the charging state according to the first embodiment, the second charging-pad-side terminal 75 is stopped on the clean slid surface on which the first charging-pad-side terminal 73 slides and both the first charging-pad-side terminal 73 and the second charging-pad-side terminal 75 are conductively connected to the electric contact surfaces 25. Accordingly, the power supply circuit of the handset 15 is charged from the charging pad 13 via the charging-pad-side terminals and the electric contact surfaces 25.

Next, operation of the wireless telephone 11 according to the first embodiment will be described.

In the wireless telephone 11, the charging pad 13 includes the body portion 17 having the recess 23 into which the power receiving unit 27 of the handset 15 is inserted. The power receiving unit 27 includes the exposed electric contact surfaces 25. The charging pad 13 includes a first charging-pad-side terminal formed by a torsion coil spring and provided in the recess 23. The first charging-pad-side terminal relatively slides on the electric contact surfaces 25 accompanying the insertion of the power receiving unit 27 into the charging pad 13, and is conductively connected to the electric contact surfaces 25 at a position where the first charging-pad-side terminal stops sliding after the insertion of the power receiving unit 27 is completed. The charging pad 13 includes a second charging-pad-side terminal formed by a torsion coil spring and provided in the recess 23. The second charging-pad-side terminal relatively slides on the electric contact surfaces 25 accompanying the insertion of the power receiving unit 27 into the charging pad 13.

The charging pad 13 includes a plurality of first and second charging-pad-side terminals in the recess 23. When the power receiving unit 27 of the handset 15 starts to be inserted into the recess 23, the contact portion 57 of a charging-pad-side terminal first contacts a tip end of the electric contact surface 25 in the inserting direction. The electric contact surface 25 is inclined in the power receiving unit 27 in a direction in which the displacement amount (that is, the spring stress) of the contact portion 57 gradually increases accompanying the insertion of the handset 15.

The charging-pad-side terminal that has contacted the tip end of the electric contact surface 25 in the inserting direction is gradually pressed against the electric contact surface 25 while relatively sliding on the electric contact surface 25 accompanying the insertion of the power receiving unit 27.

When the contact portion 57 is gradually pressed in, the charging-pad-side terminal is twisted in a direction in which the coil spring 77 is wound. The contact portion 57 of the charging-pad-side terminal slides from the front end of the electric contact surface 25 in the inserting direction to the rear end thereof in the inserting direction by the elastic restoring force (the spring stress) accumulated at this time. Accordingly, the linear contact portion 57 of the charging-pad-side terminal moves in the direction orthogonal to the axis of the spring wires so that foreign matters adhered to the electric contact surface 25 are removed (self-cleaning) in a planar range.

The charging-pad-side terminal stops sliding on the electric contact surface after the insertion of the power receiving unit 27 is completed. At this time, foreign matters are pushed to the downstream side of the contact portion 57 in the sliding direction. The contact portion 57 stops on the electric contact surface 25 on which foreign matters are pushed aside. As a result, the charging-pad-side terminal can be conductively connected to the electric contact surface 25 stably while preventing re-adhesion of dirt accompanying reversal of the movement direction, which is a concern in the configuration of the related art, since the contact portion 57 stops on the clean electric contact surface 25 on which foreign matters are pushed aside.

The above is operation of a simple terminal when the number of the charging-pad-side terminal is one. With the operation of the simple terminal, the charging-pad-side terminal reduces conduction failure due to inclusion of foreign matters accompanying reversal of the moving direction and improves conduction reliability.

Therefore, with the charging pad 13 including a plurality of, for example, two, charging-pad-side terminals relative to the electric contact surface 25, the conduction failure can be reduced by half and the conduction reliability can be doubled as compared with the case of one charging-pad-side terminal. Therefore, the charging pad 13 can perform a more stable charging operation.

In the first embodiment, the charging pad 13 includes the body portion 17 having the recess 23 into which the power receiving unit 27 of the handset 15 is inserted. The power receiving unit 27 includes the exposed electric contact surface 25. The charging pad 13 includes two charging-pad-side terminals formed by torsion coil springs and provided in the recess 23. The charging-pad-side terminals relatively slide on the electric contact surface 25 accompanying the insertion of the power receiving unit 27 into the charging pad 13. The first charging-pad-side terminal 73 first slides with the insertion of the power receiving unit 27. After the power receiving unit 27 is completely inserted, the second charging-pad-side terminal 75 is conductively connected to the surface of the electric contact surface 25 slid by the first charging-pad-side terminal 73.

In the charging pad 13, the contact portions 57 of the two charging-pad-side terminals are arranged vertically (that is, in tandem) in the inserting direction of the power receiving unit 27 relative to one electric contact surface 25. In the charging pad 13 including two contact portions 57, as described above, the conduction reliability can be doubled as compared with the charging pad 13 including one contact portion 57.

In the charging pad 13, after the first charging-pad-side terminal 73 slides on the surface of the electric contact surface 25, the second charging-pad-side terminal 75 is conductively connected to the slid surface. That is, after the first charging-pad-side terminal 73 slides on the surface of the electric contact surface 25, at least the second charging-pad-side terminal 75 is conductively connected to the slid surface. The expression "at least the second charging-pad-side terminal 75" means that the first charging-pad-side terminal 73 may be apart from the electric contact surface 25. In this case, the first charging-pad-side terminal 73 may not have a conduction function. That is, only the second charging-pad-side terminal 75 may be in electric conduction with the electric contact surface 25. Of course, the first charging-pad-side terminal 73 may be conductively connected to the electric contact surface 25 together with the second charging-pad-side terminal 75.

Figure 11:
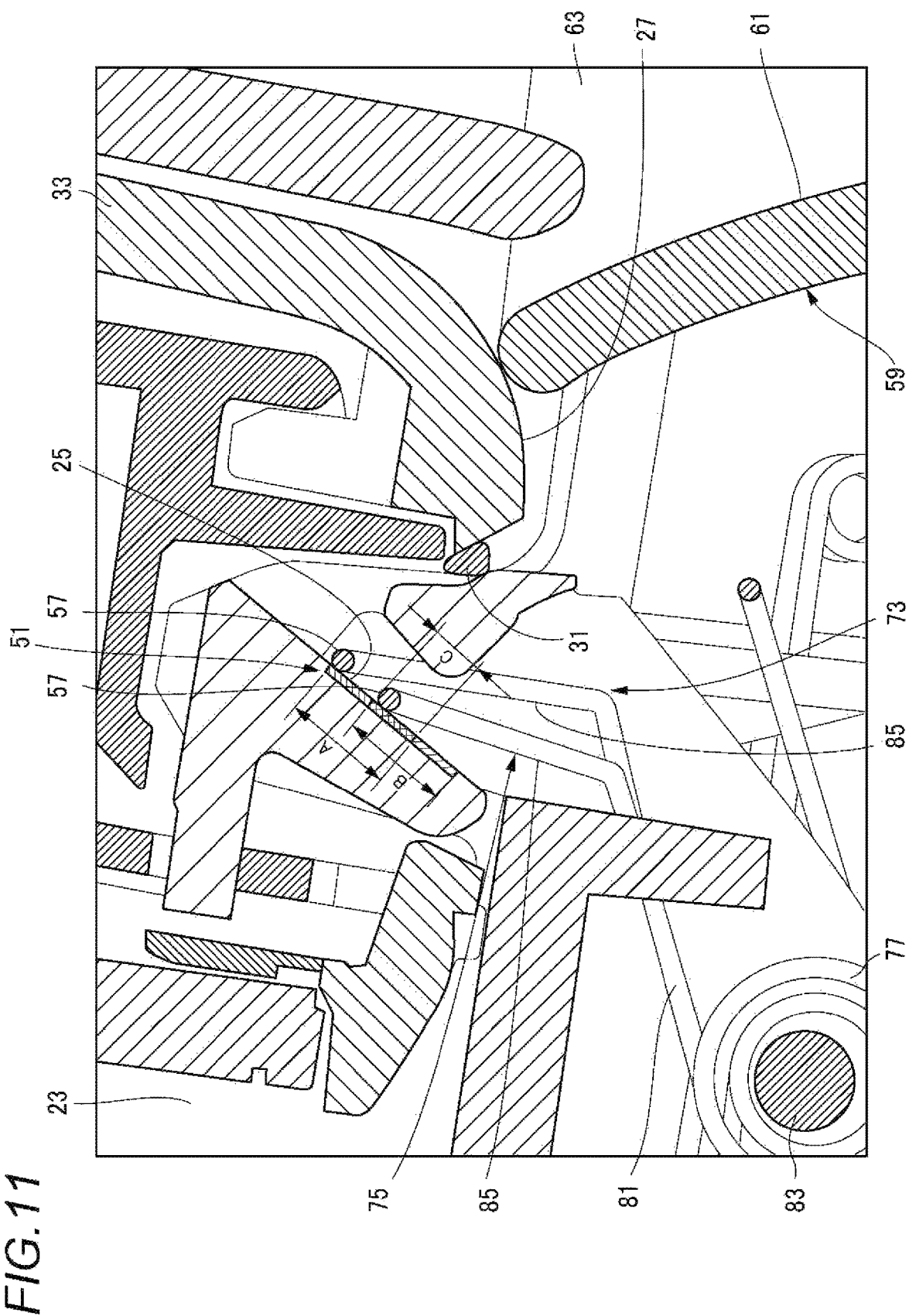
FIG. 11 shows operation of a charging-pad-side terminal.

FIG. 11 shows operation of a charging-pad-side terminal. In the first embodiment, when the sliding region of the first charging-pad-side terminal 73 is A and the sliding region of the second charging-pad-side terminal 75 is B, the rear portion of the sliding region A in the sliding direction overlaps with the front portion of the sliding region B in the sliding direction and serves as an overlapping portion C. That is, in the charging pad 13, the second charging-pad-side terminal 75 can be conductively connected to the clean slid surface from which foreign matters are removed by the first charging-pad-side terminal 73. Accordingly, the charging pad 13 can further reduce the conduction failure due to inclusion of foreign matters and further improve the conduction reliability.

The charging pad 13 includes the body portion 17 having the recess 23 into which the power receiving unit 27 of the handset 15 is inserted. The power receiving unit 27 includes the exposed electric contact surface 25. The charging pad 13 includes two charging-pad-side terminals formed by torsion coil springs and provided in the recess 23. The charging-pad-side terminals relatively slide on the electric contact surface 25 accompanying the insertion of the power receiving unit 27 into the charging pad 13, and are both conductively connected to the electric contact surface 25 after the insertion of the power receiving unit 27 is completed.

In the charging pad 13, the contact portions 57 of the two charging-pad-side terminals are arranged vertically (that is, in tandem) in the inserting direction of the power receiving unit 27 relative to one electric contact surface 25.

The two charging-pad-side terminals of the charging pad 13 are both conductively connected to the electric contact surface 25. That is, the first charging-pad-side terminal 73 and the second charging-pad-side terminal 75 of the charging pad 13 are both conductively connected to the electric contact surface 25. When the sliding region of the first charging-pad-side terminal 73 is A and the sliding region of the second charging-pad-side terminal 75 is B, the sliding region A and the sliding region B do not overlap with each other. That is, in the charging pad 13 according to this modification, the first charging-pad-side terminal 73 and the second charging-pad-side terminal 75 separately remove foreign matters at different parts of one electric contact surface 25. The first charging-pad-side terminal 73 and the second charging-pad-side terminal 75 are separately conductively connected to two clean slid surfaces from which foreign matters are removed.

In the charging pad 13 according to the modification that includes two charging-pad-side terminals, as described above, the conduction reliability can be doubled as compared with the charging pad 13 including one charging-pad-side terminal.

The charging pad 13 includes the cover 59 that is movable in the recess 23 between the position at which the charging-pad-side terminals are covered and the position at which the charging-pad-side terminals are exposed. The cover 59 is moved to the position at which the charging-pad-side terminals are exposed by being pressed by the power receiving unit 27 inserted into the recess 23.

In the charging pad 13, the cover 59 is movable in the recess 23 between the position at which the charging-pad-side terminals are covered and the position at which the charging-pad-side terminals are exposed. The cover 59 is pressed by the power receiving unit 27 of the handset 15 inserted into the recess 23 so that the charging-pad-side terminals are exposed. Therefore, the charging-pad-side terminals are covered by the cover 59 when the handset 15 is not inserted into the charging pad 13. Accordingly, when the handset 15 is not inserted, the charging-pad-side terminals can prevent adhesion of dirt such as foreign matters entering the recess 23 from the outside.

As a modification, the first charging-pad-side terminal 73 of the two charging-pad-side terminals of the charging pad 13 may be stopped at a position apart from the electric contact surface 25.

Figure 12:
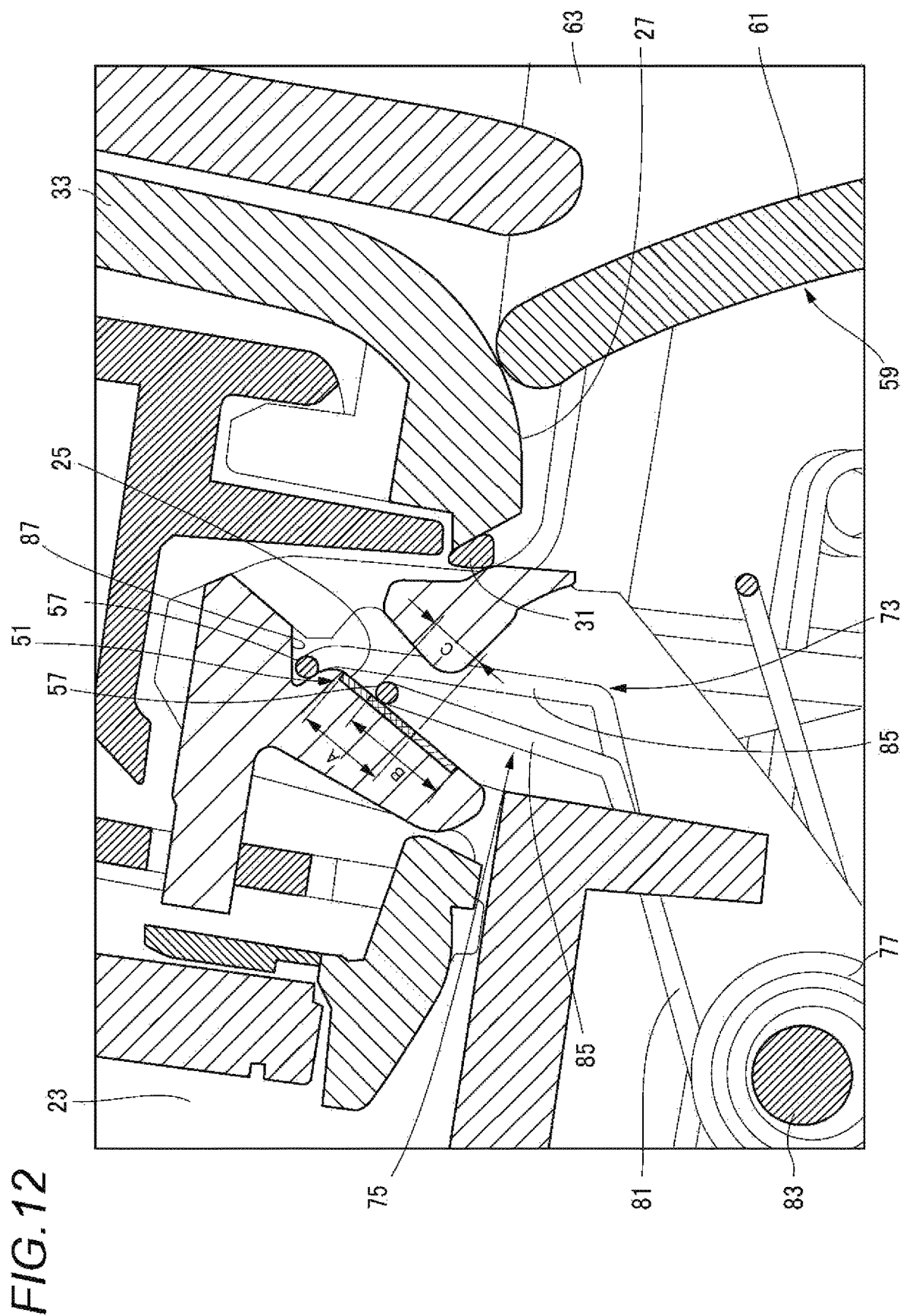
FIG. 12 shows operation of a charging-pad-side terminal according to a modification.

FIG. 12 shows operation of a charging-pad-side terminal according to a modification. In the charging pad 13, one charging-pad-side terminal (the first charging-pad-side terminal 73) stops at a position apart from the electric contact surface 25. At this time, after the first charging-pad-side terminal 73 slides through the surface of the electric contact surface 25, the second charging-pad-side terminal 75 is stopped and conductively connected to the clean slid surface.

With the first charging-pad-side terminal 73 moving to a position apart from the electric contact surface 25, foreign matters removed by the sliding through the electric contact surface 25 can be discharged to a position separated from the electric contact surface 25. The separated position may serve as a foreign matter accumulation position 87. As a result, the removed foreign matters or the like hardly adhere to the electric contact surface 25 again.

In this modification, the electric contact surface 25 is not pressed by the first charging-pad-side terminal 73 since the first charging-pad-side terminal 73 is not in contact with the electric contact surface 25. As a result, the pressing load from the electric contact surface 25 is applied only to the second charging-pad-side terminal 75 and the second charging-pad-side terminal 75 may be conductively connected to the electric contact surface 25 with a relatively strong pressing force. This is because the pressing load from the electric contact surface 25 that is received by one charging-pad-side terminal is larger than the pressing load shared by each of two charging-pad-side terminals.

The pressing force of the first charging-pad-side terminal 73 of the charging pad 13 applied to the electric contact surface 25 is larger than the pressing force of the second charging-pad-side terminal 75 applied to the electric contact surface 25.

In the charging pad 13, the pressing force of one charging-pad-side terminal (the first charging-pad-side terminal 73), which first slides on the electric contact surface 25, applied to the electric contact surface 25 is larger than the pressing force of the other charging-pad-side terminal (the second charging-pad-side terminal 75) applied to the electric contact surface 25. Herein the pressing force refers to the normal stress of a torsion coil spring. By increasing the pressing force applied to the electric contact surface 25, the first charging-pad-side terminal 73 can increase its ability for removing foreign matters further than the second charging-pad-side terminal 75. As a result, after foreign matters are almost removed by the increased ability for removing foreign matters of the first charging-pad-side terminal 73, the second charging-pad-side terminal 75 can be conductively connected to the clean electric contact surface 25. Accordingly, it is possible to prevent the conduction connection between the electric contact surface 25 and the second charging-pad-side terminal 75 with remaining foreign matters when the ability for removing foreign matters of the first charging-pad-side terminal 73 and that of the second charging-pad-side terminal 75 are reversed.

In the charging pad 13, the spring load of the first charging-pad-side terminal 73 is larger than the spring load of the second charging-pad-side terminal 75.

In the charging pad 13, the spring load of one charging-pad-side terminal (the first charging-pad-side terminal 73), which first slides on the electric contact surface 25, is larger than the spring load of the other charging-pad-side terminal (the second charging-pad-side terminal 75). By increasing the spring load, the first charging-pad-side terminal 73 can increase its ability for removing foreign matters further than the second charging-pad-side terminal 75. That is, foreign matters can be removed by a strong force during sliding. As a result, after foreign matters are removed by the increased ability for removing foreign matters of the first charging-pad-side terminal 73, the second charging-pad-side terminal 75 can be conductively connected to the clean electric contact surface 25. Accordingly, it is possible to prevent the conduction connection between the electric contact surface 25 and the second charging-pad-side terminal 75 with remaining foreign matters when the ability for removing foreign matters of the first charging-pad-side terminal 73 and that of the second charging-pad-side terminal 75 are reversed.

The first charging-pad-side terminal 73 can also increase the service life (increase the durability) while obtaining large spring stress (that is, ability for removing foreign matters) by increasing the spring load further than the second charging-pad-side terminal 75.

The wireless telephone 11 includes the charging pad 13 and the handset 15 in which the power receiving unit 27 including the exposed electric contact surface 25 is inserted into the recess 23.

In the wireless telephone 11, the charging-pad-side terminals stop on the electric contact surface 25 on which foreign matters are pushed aside, and accordingly the charging-pad-side terminals are conductively connected to the electric contact surface 25 stably while preventing re-adhesion of dirt accompanying reversal of the movement direction. Accordingly, the conduction failure due to inclusion of foreign matters can be reduced and the conduction reliability during charging can be improved.

Although various embodiments and modifications are described above with reference to the drawings, it is needless to say that the present disclosure is not limited to such examples. It will be apparent to those skilled in the art that various changes and modifications can be conceived within the scope of the claims, and it should be understood that such changes and modifications belong to the technical scope of the disclosure.

The present disclosure is useful as a charging pad and a wireless telephone that enable a more stable charging operation.

What is claimed is:

1. A charging pad comprising:
   a body portion having a recess into which a power receiving unit of a handset is configured to be inserted, the power receiving unit having an exposed electric contact surface; and
   two charging-pad-side terminals formed by torsion coil springs and provided in the recess, the charging-pad-side terminals being configured to relatively slide on the electric contact surface of the power receiving unit accompanying an insertion of the power receiving unit into the charging pad,
   wherein a first charging-pad-side terminal of the two charging-pad-side terminals first slides on a surface of the electric contact surface with the insertion of the power receiving unit, and
   wherein after the insertion of the power receiving unit is completed, a second charging-pad-side terminal of the two charging-pad-side terminals is conductively connected to the surface slid by the first charging-pad-side terminal.

2. The charging pad according to claim 1, further comprising:
   a cover provided movably in the recess between a position at which the charging-pad-side terminals are covered and a position at which the charging-pad-side terminals are exposed, the cover being configured to move to the position at which the charging-pad-side terminals are exposed by being pressed by the power receiving unit inserted into the recess.

3. The charging pad according to claim 1, wherein the first charging-pad-side terminal stops at a position apart from the electric contact surface.

4. The charging pad according to claim 1, wherein a pressing force of the first charging-pad-side terminal applied to the electric contact surface is larger than a pressing force of the second charging-pad-side terminal applied to the electric contact surface.

5. The charging pad according to claim 1, wherein a spring load of the first charging-pad-side terminal is larger than a spring load of the second charging-pad-side terminal.

6. A wireless telephone comprising:
   a charging pad including:
      a body portion having a recess into which a power receiving unit of a handset is configured to be inserted, the power receiving unit having an exposed electric contact surface; and
      two charging-pad-side terminals formed by torsion coil springs and provided in the recess, the charging-pad-side terminals being configured to relatively slide on the electric contact surface of the power receiving unit accompanying an insertion of the power receiving unit into the charging pad,
      wherein a first charging-pad-side terminal of the two charging-pad-side terminals first slides on a surface of the electric contact surface with the insertion of the power receiving unit, and
      wherein after the insertion of the power receiving unit is completed, a second charging-pad-side terminal of the two charging-pad-side terminals is conductively connected to the surface slid by the first charging-pad-side terminal; and
   a handset in which the power receiving unit having the exposed electric contact surface is inserted into the recess of the body portion of the charging pad.

* * * * *